United States Patent
Meller

(10) Patent No.: US 7,516,963 B2
(45) Date of Patent: Apr. 14, 2009

(54) SEALING ARRANGEMENT WITH SUPPORTING RING, AND SUPPORTING RING

(75) Inventor: Dieter Meller, Alfter (DE)

(73) Assignee: GAPI Technische Produkte GmbH, Rosrath (DE)

( * ) Notice: Subject to any disclaimer, the term of this patent is extended or adjusted under 35 U.S.C. 154(b) by 0 days.

(21) Appl. No.: 11/252,195

(22) Filed: Oct. 17, 2005

(65) Prior Publication Data

US 2006/0087085 A1 Apr. 27, 2006

(30) Foreign Application Priority Data

Oct. 15, 2004 (DE) .............. 10 2004 050 584

(51) Int. Cl.
*F16J 15/00* (2006.01)
*F16J 9/12* (2006.01)
*F02F 5/00* (2006.01)

(52) U.S. Cl. .............. 277/584; 277/587; 277/453

(58) Field of Classification Search ............ 277/584, 277/587, 437, 438, 452, 453
See application file for complete search history.

(56) References Cited

U.S. PATENT DOCUMENTS

| | | | | |
|---|---|---|---|---|
| 2,360,731 A | * | 10/1944 | Smith | 277/453 |
| 2,420,104 A | | 5/1947 | Smith | 309/23 |
| 2,462,586 A | | 2/1949 | Whittingham | 309/23 |
| 2,593,193 A | * | 4/1952 | Rockwell | 277/587 |
| 3,166,832 A | | 1/1965 | Scannell | 29/156.62 |
| 3,455,566 A | | 7/1969 | Hull et al. | 277/176 |
| 3,614,114 A | * | 10/1971 | Traub | 277/589 |
| 3,630,532 A | | 12/1971 | Traub et al. | 277/144 |
| 4,291,890 A | * | 9/1981 | Walker | 277/587 |
| 4,681,327 A | | 7/1987 | D'Agostino et al. | 277/29 |
| 4,699,387 A | | 10/1987 | Buseth | 277/167.5 |
| 6,502,826 B1 | | 1/2003 | Schroeder et al. | 277/468 |

FOREIGN PATENT DOCUMENTS

| | | |
|---|---|---|
| EP | 1 437 536 A2 | 7/2004 |
| FR | 589386 | 5/1925 |
| JP | 11315925 A | 11/1999 |
| JP | 2002161983 A | 6/2002 |
| SE | 308842 | 2/1969 |

OTHER PUBLICATIONS

European Search Report dated Dec. 5, 2005, received in parallel European patent application No. 05 021 573 with EPO communication (7 pgs).

* cited by examiner

*Primary Examiner*—Patricia L Engle
*Assistant Examiner*—Gilbert Y Lee
(74) *Attorney, Agent, or Firm*—Grossman Tucker Perreault & Pfleger, PLLC

(57) ABSTRACT

The invention relates to a sealing arrangement with an elastic sealing ring, which is located in sealing fashion between a first and a second component in a continuous groove (3) running around the first component, and is compressed in the groove in installed state, deforming its cross-section. At least one supporting ring (21, 22) is provided, which lies in sealing fashion against the sealing ring, while an opposite, supporting surface (9) lies against a groove flank (6) The supporting ring (21, 22) is positioned by the compressed sealing ring (2) in its position at the gap (13) to be sealed between the first and second components. As a result, extrusion of the sealing ring through the gap provided between the two components to be sealed is prevented.

18 Claims, 3 Drawing Sheets

Figure 1:
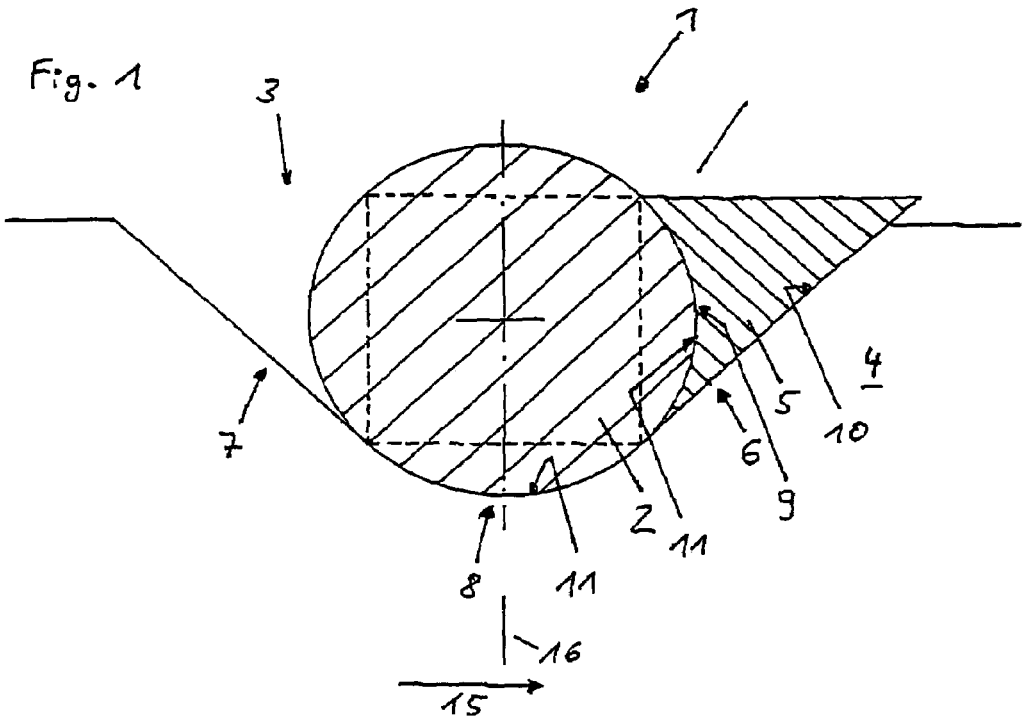

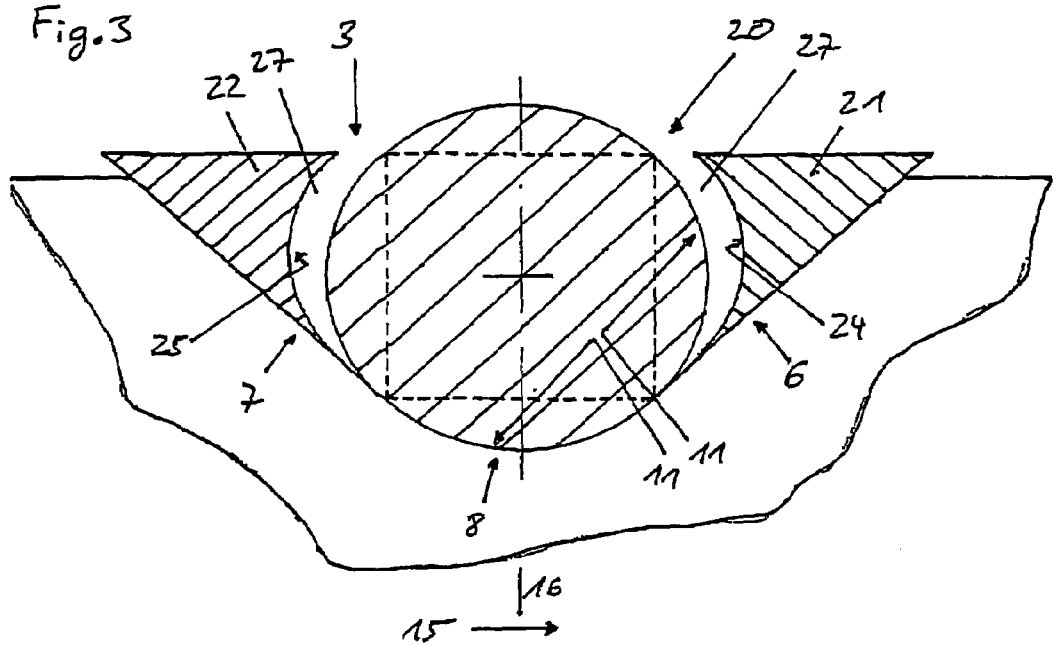
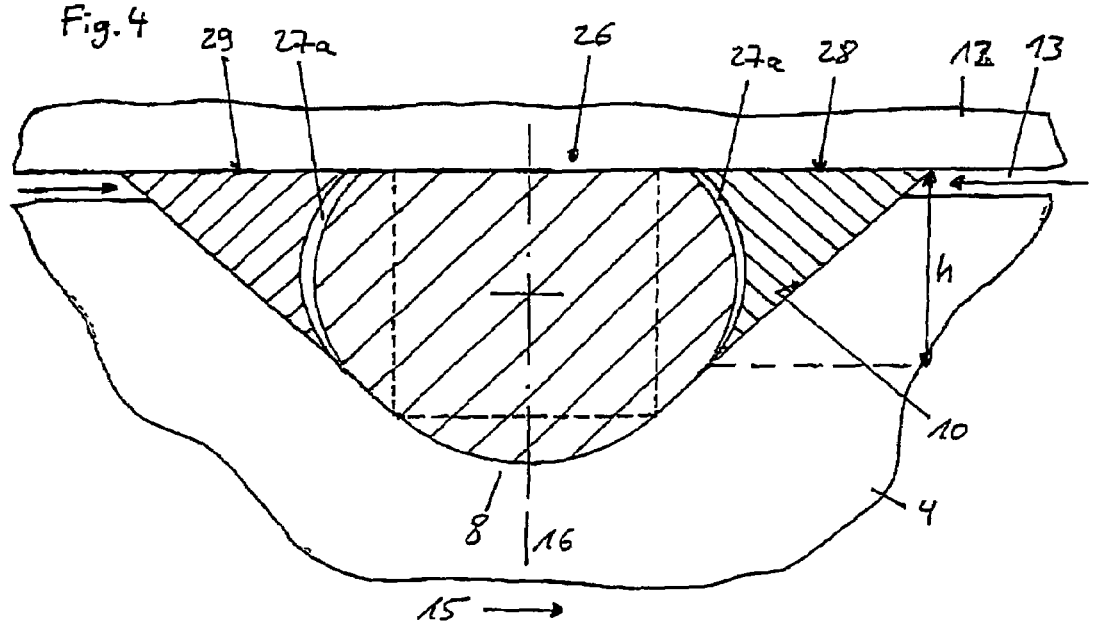

SEALING ARRANGEMENT WITH SUPPORTING RING, AND SUPPORTING RING

The invention relates to a sealing arrangement with an elastic sealing ring, where the sealing ring is located in a continuous groove running around the inner or outer circumference of a first component, where the groove displays two, opposite groove flanks and a groove base, and the sealing ring lies against at least one groove flank and/or the groove base in sealing fashion, where the sealing ring is located in sealing fashion between the first component and a second component and compressed into the groove in installed state, deforming its cross-section, where a supporting ring is further provided, one sealing surface of which lies in sealing fashion against the sealing ring, while an opposite, supporting surface lies in supporting fashion against a groove flank on the supporting-ring side, and where the sealing ring displays at least two sealing areas with an arc-shaped cross-section that face the groove base and the supporting ring.

Sealing arrangements of this kind are often used as rotary shaft seals or piston rings, where the sealing ring is mostly designed as an O-ring. In this context, the gap resulting between the first and second components is partly covered by the supporting ring, in order to avoid extrusion of the sealing ring through the gap at high temperatures and high, especially fluctuating, pressures. The groove of the first component accommodating the sealing ring is essentially designed as a square groove in this context. Despite the provision of supporting rings, there is still a need to reliably prevent extrusion of the sealing ring through the gap to be sealed between the two components at high pressures and temperatures.

Further, there is still a need to increase the service life of the sealing ring, also in the event of fluctuating pressures, since the dynamic stressing exposes the sealing ring to strong alternating stresses, which are hard to determine theoretically and ultimately lead to fatiguing of the sealing ring material. As a result, the sealing action of the sealing ring is impaired, and the ring is more easily extruded through the gap.

Further, in the case of conventional sealing arrangements, the sealing ring has to undergo a complex finishing process in order to produce a sufficiently good surface quality for guaranteeing the necessary dependability of the sealing arrangement. Deburring of the sealing ring is a key process step in this context, this involving a highly complex process with deep-cooling of the sealing ring and being a major factor in determining the production costs.

The object of the invention is thus to create a sealing arrangement with supporting ring, in which extrusion of the sealing ring through the gap provided between the two components to be sealed is made more difficult, where the service life of the sealing ring is increased, and in which sealing rings that are less complex to manufacture can be used while maintaining at least equal tightness and dependability of the sealing arrangement. Further, the object is to provide a corresponding supporting ring.

According to the invention, the object is solved by a sealing arrangement in which the groove displays as essentially triangular cross-section, where the groove base is assigned to one corner of the cross-section, and at least the supporting groove flank supporting the supporting ring is inclined relative to the sealing axis, and where the supporting ring displays an essentially triangular cross-section and a smaller height than the distance of the groove base from the second component, and makes surface contact with the supporting groove flank, and where the supporting ring is positioned in its target position at the gap to be sealed between the first and second components. This positioning refers to the installed sealing arrangement with compressed sealing ring, particularly to the intended operating conditions of the associated device or machine.

As a result of the groove and the supporting ring being designed with an essentially triangular cross-section, the supporting ring can, as a result of the sealing ring being compressed and its cross-section changed during installation between the two components, be positioned in exactly defined manner at the gap to be bridged. The sealing ring and the supporting ring thus mutually center each other and force each other into a specific position when installed. Even in the presence of varying operating conditions, such as temperatures or pressures, under which the sealing ring compressed between the components can display a slightly different cross-sectional geometry in each case, the supporting ring is thus always positioned in its optimum position, thereby both preventing extrusion of the sealing ring through the gap to be sealed between the two components and additionally resulting in the sealing ring always being supported over the largest possible area with the greatest possible adaptation to the cross-sectional shape of the supporting rings. This avoids flexing work of the sealing ring in the event of fluctuating pressures, or undesirable pinching of the sealing ring, which lead to material fatigue, thereby substantially increasing the service life of the sealing ring.

Due to the inclination of the supporting ring-side groove flank relative to the sealing ring axis, as a result of which the groove widens from the groove base towards the opposite component, the supporting ring can, at least to some degree, be shifted towards the groove base or towards the second component, this possibly being accomplished with slight displacement of the sealing ring when the sealing arrangement is installed. The groove flank, which is designed as the lateral surface of a truncated cone, thus extends at a constant inclination relative to the supporting ring or sealing ring axis at least essentially up to the gap to be sealed. In this context, the radial extension of the supporting ring-side groove flank is preferably larger than the radial extension of the supporting ring. The groove flank thus acts as a kind of sliding plane for the supporting ring when the latter undergoes dynamic stressing, and thus also dynamic expansion, where the supporting ring always makes surface contact, preferably full surface contact, with the supporting ring-side groove flank.

It goes without saying that the sealing ring is a continuous sealing ring with closed circumference, whereas the supporting ring can, if it has a certain (very slight) degree of elasticity, be a ring with closed circumference, but is preferably provided with a division, or an area of thinner material, that facilitates expansion of the supporting ring. The division of the supporting ring can, in particular, be designed such that dividing areas are formed that are located one behind the other in the direction of the supporting ring axis and, when installed, overlap each other and are pressed against each other by the sealing ring, thus acting in the manner of a lock. The elasticity of the sealing ring, determined according to the modulus of elasticity, for example, is preferably a multiple of, or 1 to 2 or more powers of ten greater than, that of the supporting ring. As a result, even at very high intended pressures, the supporting ring is at least essentially, or completely, dimensionally stable as regards its cross-sectional shape, and can be expanded only to the very limited degree necessary to provide full surface contact on the supporting ring-side groove flank at all times. In an arrangement without a supporting ring, the sealing ring would, under identical conditions, perform very great flexing work and movement within the groove, its cross-section changing in the process.

The compression of the sealing ring and the associated deformation of its cross-section occur because the sealing ring located in the groove has a larger outside diameter than the distance between the groove base and the second component, meaning that the sealing ring is squeezed in the sealing ring plane during installation and expanded in the direction of the sealing ring axis. In this context, the sealing ring is at least essentially, or completely, incompressible under the respective operating conditions.

In addition to the two arc-shaped sealing surfaces, which face the groove base or the supporting ring and contact it in sealing fashion, the sealing ring preferably displays a further, arc-shaped cross-sectional area on the side opposite the supporting ring. The sealing ring is preferably of symmetrical design in relation to the sealing ring plane, which lies perpendicular to the sealing ring axis. The sealing ring particularly preferably displays a circular cross-section. The sealing ring is preferably designed as an O-ring.

The groove is preferably of symmetrical design in relation to the principal plane, in which the groove base runs, although the two groove flanks can, where appropriate, each also display a different angle of incidence relative to the sealing ring axis. The groove base is preferably of arc-shaped design, particularly preferably with a radius that at least approximately corresponds to the radius of curvature of the opposite area of the sealing ring when the sealing ring is dismantled, or is equal to or greater than this. In the event of a circular sealing ring cross-section, this applies accordingly to the cross-sectional radius.

The supporting ring-side groove flank of the groove accommodating the sealing ring is inclined relative to the sealing ring axis, preferably at an angle of 30° to 60°, particularly preferably approx. 45°, in which context the groove widens towards the open side of the groove as a result. Dimensioning the angle in this way means that the supporting ring can be effectively centered by the sealing ring and, at the same time, pressed against the supporting groove flank. The cross-section of this groove flank preferably extends in linear fashion away from the groove base and corresponds to a lateral surface with the shape of a truncated cone.

If no supporting ring is assigned to one of the groove flanks, this groove flank can display a different geometry, although both groove flanks are preferably designed as lateral surfaces of a truncated cone, which preferably both extend up to, or at least almost up to, the gap to be sealed.

Further, the groove base is preferably designed in such a way that, when inserted loosely, i.e. without any compression and change of cross-section due to assembly with the second component, the sealing ring contacts the groove base over an angle at the circumference of approx. 45° to approx. 120° or 140°, preferably approx. 60° to approx. 120°, particularly preferably approx. 90°. As a result, the sealing ring is surrounded in surface contact by the groove base over a large angle at circumference of the sealing ring cross-section, this achieving great tightness of the sealing arrangement and, at the same time, exact positioning of the sealing ring. It goes without saying that, generally speaking, the sealing ring can, when inserted loosely in the groove, lie against the first component with or without pre-tension, although this takes place without any change in cross-section referred to the dismantled state.

Particularly preferably, when inserted loosely in the groove and/or when compressed, the sealing ring lies continuously against the groove base, and in some areas against the two groove flanks following on from the groove base, meaning that the groove flanks protect the sealing ring from displacement or deformation on both sides of the groove base. Where appropriate, the sealing ring can, also when inserted loosely in the groove, lie only against the groove base and essentially unilaterally, on a side facing towards or away from a supporting ring, on the groove wall, forming a sealing area on the first component.

When inserted loosely, i.e. in uncompressed state, the sealing ring is preferably surrounded over an angle at circumference of greater than/equal to 45°, preferably greater than/equal to 60° or 90°, by the groove and/or the supporting ring, creating sealing contact, such that the radius of curvature of the sealing area of the groove and/or the supporting ring corresponds to the radius of curvature of the sealing ring. If only one supporting ring is provided, as described below, the sealing ring can be surrounded over an angle at circumference of greater than/equal to 120°, preferably 180° or more, by the groove and the supporting ring, the contact surface of which display a radius of curvature like the contact surface of the sealing ring inserted loosely in the groove, particularly corresponding to the radius of the sealing ring.

It is further preferred that the angle enclosed between the two groove flanks in the region of the groove base is approx. 60° to approx. 120°, preferably approx. 90° to 100°, particularly approx. 90°.

In order both to prevent extrusion of the sealing ring and to increase its service life, it has proved to be particularly advantageous if the sealing surface of the supporting ring opposite the sealing ring is concave. As a result of this, the sealing ring, which is pressed against the supporting ring by the pressure of the fluid medium to be sealed off, can be retained particularly effectively in its target position by the supporting ring, in which context flexing work of the sealing ring can be avoided particularly effectively, even in the presence of pulsating pressures.

A particularly long service life of the sealing arrangement, with great tightness and a reduced tendency to extrusion, is achieved if the concave area of the supporting ring at least essentially transitions steadily into the adjacent sealing area of the groove. In this context, the concave area of the supporting ring can transition into an area of the groove flank that at least essentially extends tangentially to the transitional area of the concave area of the supporting ring. Alternatively, the concave area of the supporting ring can also transition into the groove base, which has, in the transitional area to the supporting ring, at least essentially the same radius of curvature as the latter. Irregular contact surfaces with dramatic changes in the angles of incidence of the contact surfaces for the sealing ring are avoided in this way. As a result of this, the sealing surfaces are adapted to the sealing ring, and non-uniform pressure distributions in the sealing ring, which lead to material fatigue, especially in the event of fluctuating pressures, are avoided.

The curvature of the concave area of the supporting ring can at least roughly be equal to the curvature of the opposite sealing ring area in dismantled state or when only loosely inserted in the groove and/or in compressed state of the sealing ring. This can particularly apply if the curvature of the concave area and of the sealing ring area have a circular arc profile. Further, this can particularly apply if the sealing ring is only supported by a supporting ring on one side. The radius of curvature of the concave area of the supporting ring can also be smaller, preferably only marginally smaller, than the radius of curvature of the opposite sealing ring area when the sealing ring is dismantled or inserted loosely. In compressed state, the two radii of curvature are then preferably at least approximately equal. This can particularly apply if the sealing ring is surrounded by supporting rings on both sides. In each case, the concave area of the supporting ring preferably has a circular arc profile, although it can also display a different, arc-like shape, such as an essentially elliptical cross-section. Particularly preferably, the radius of curvature of the concave area of the supporting ring in each case corresponds to the cross-sectional radius of the dismantled sealing ring.

The radius of curvature of the concave area of the supporting ring opposite the sealing ring is preferably approx. 5% to 20%, or up to 25%, smaller than the radius of curvature of the sealing ring, particularly preferably approx. 10% to 15% smaller. It has proved to be particularly favorable if the following relationship applies to radius R1 of the sealing ring area opposite the supporting ring, or the cross-sectional radius of the sealing ring, and radius R2 of the concave area of the supporting ring opposite the sealing ring:

$$R2=(2\times R1+LQ)/4$$

where $$LQ=\sqrt{2}\times R1$$

In this context, LQ is the edge length of a square whose envelope is the cross-section of the sealing ring. Thus, the ratio R2:R1 is preferably R2=0.85 R1. The ratio R2/R1 preferably does not deviate from the above ideal value by more than 15%, preferably not more than 10%, particularly preferably not more than 2% to 5%.

The distance S(R2) of the center of curvature of the concave area of the supporting ring from the center of curvature of the convexity of the sealing ring opposite the supporting ring, or the center point of the sealing ring, preferably corresponds to approx. 0.25 to 0.45 times, preferably 0.3 to 0.4 times, particularly preferably approx. 0.35 times the radius of the sealing ring curvature. As a result of this, when the sealing arrangement is installed, an arrangement of sealing ring and supporting ring is created in which the sealing ring is particularly effectively prevented from performing flexing work, this increasing the service life of the sealing ring (the ratios of R1:R2 and the value for S(R2) each apply to the sealing ring inserted loosely in the groove).

The radial height of the supporting ring is preferably approx. 40% to approx. 80%, preferably approx. 50% to approx. 75%, of the radial groove depth and/or of the distance of the groove base from the second component.

Further, the radially inner and radially outer border of the sealing ring-side sealing surface of the supporting ring preferably lie in a plane that is at least essentially parallel to the principal plane of the sealing ring.

Further, the sealing ring arrangement is preferably designed in such a way that the compression of the sealing ring during assembly of the sealing arrangement, which brings about a reduction in the effective diameter of the sealing ring as a whole, roughly or exactly corresponds to the sealing ring height projecting beyond an inscribed square, which is enveloped by the sealing ring cross-section and in which all corner points preferably lie on the arc of the circle. As a result of this, the changes in cross-section resulting from installation of the sealing ring are particularly easy to determine in quantitative terms, meaning that the supporting ring, particularly its concave sealing-ring side, can easily be designed in optimum fashion. The height of the compressed sealing ring in installed state preferably does not deviate from the ideal value given above, which is determined by the edge length of the inscribed square, by more than 10% to 15%, preferably not more than 2% to 5%.

In installed state, the diameter of the sealing ring can be compressed by more than 3% to 5%, preferably approx. 10% to 20%, or possibly also more, particularly preferably approx. 15%, compared to the diameter when inserted loosely in the groove.

The sealing ring and the supporting ring are preferably designed in such a way that, in installed state of the sealing ring, compressed between the two components to be sealed, and the supporting ring, a gap remains at least in some areas, the supporting ring making surface contact with the supporting groove flank. The provision of a gap is particularly of importance when the sealing ring is arranged between two supporting rings. The gap preferably extends over $\geq 50\%$ or $\geq 75\%$, particularly preferably the entire radial extension of the supporting ring, or the extension of the sealing surface of the supporting ring to be positioned against the sealing ring. As a result of this, in installed state of the sealing arrangement—without pressurization by the fluid to be sealed off—the sealing ring still has a certain degree of play, e.g. in order to be able to absorb thermal expansion of the sealing ring and/or pressure fluctuations, this avoiding excessive material stress.

Particularly preferably, the volume of the gap between sealing ring and supporting ring is between 1% and 8% of the sealing ring volume, preferably between approx. 2% and approx. 6%, particularly preferably approx. 3%.

Starting from the gap provided between the two components to be sealed off, the supporting ring preferably extends only roughly up to the sealing ring and is a slight distance away from it. As a result of this, the sealing ring can, in compressed state, adapt to the area of the supporting ring facing the groove base. The concave area of the supporting ring is preferably designed in such a way that, when the sealing ring is inserted loosely in the groove, the gap extending between sealing ring and supporting ring widens from the side of the gap facing the groove base towards the open side of the groove, preferably widening continuously. This permits particularly advantageous supporting of the sealing ring by the supporting ring.

If only one supporting ring is provided, the sealing ring can, when loosely inserted in the groove and/or in compressed state, be in surface contact, preferably over the entire contact surface, with the supporting ring without a gap. Further, if only one supporting ring is provided, the supporting ring and the sealing ring are designed in such a way that, on the groove side opposite the supporting ring, a gap is left whose cross-section when the sealing arrangement is not installed could correspond to the cross-sectional contour of the envisaged supporting ring. The gap volume when the sealing arrangement is installed can be approx. 60% or less, e.g. less than approx. 40% to 50%, of the supporting ring volume of the opposite supporting ring. This ensures that the sealing ring is reliably retained in the groove.

It goes without saying that an arrangement with one supporting ring is expedient in the event of unilateral pressurization by a fluid medium, the supporting ring being located on the low-pressure side in this case, while an arrangement with two supporting rings is expedient for bilateral pressurization. The two supporting rings can be of identical design. In this context, the sealing ring is, when the sealing ring arrangement is installed, preferably surrounded virtually completely by the two supporting rings and the groove base, as well as the second component, sealing surfaces being formed in each case, where the defined gap between supporting ring and sealing ring, described above, can be left in each case.

When the sealing ring is inserted loosely in the groove and/or when the sealing ring is compressed in the groove between the two components, there is preferably no gap between the supporting ring and the supporting ring-side groove flank, into which fluid to be sealed off could flow, particularly not to an extent significantly changing the position of the supporting ring. This can apply to sealing arrangements with one supporting ring, or with a supporting ring located on both sides of the sealing ring, in the latter case particularly to the supporting ring on the high-pressure side and/or the supporting ring on the low-pressure side.

Further, the supporting ring is particularly preferably designed in such a way that it lies against the second component in sealing fashion with a surface facing towards the second component. The supporting ring thus displays two sealing surfaces inclined relative to each other, meaning that the supporting ring is located in the manner of a wedge between the first and second components, the supporting ring lying against both components in sealing fashion. In this context, the position of the supporting ring relative to the first and second components is in each case determined by the action of the sealing ring. This generally results in a sealing arrangement displaying particularly great tightness.

The sealing arrangement according to the invention can be used with two components that are stationary relative to each other, although the first and the second component preferably move relative to each other, particularly being axially and/or radially moveable. Thus, the sealing arrangement can particularly be used as a piston ring or a rotary shaft seal. The sealing ring can in each case be located in the piston or the shaft, or in the respective casing.

If the sealing arrangement according to the invention is designed as a rotary shaft seal, it is preferably designed in such a way that, at the intended fluid pressure of the fluid sealed off by the seal, the sealing ring and the supporting ring are located in a fixed position relative to each other when the shaft rotates, and preferably also in fixed position relative to the first component displaying the groove for accommodating the sealing ring. This particularly occurs in the event of moderate to fairly high fluid pressures of the respective device displaying the sealing arrangement, but possibly also at low fluid pressures. In particular, the angle of incidence of the groove-side supporting ring surface must be selected appropriately to this end.

The sealing arrangement according to the invention is particularly suitable for use in the hydraulic equipment sector, e.g. in hydraulic transmissions, or in other applications in the automotive sector.

The supporting ring can be made of various materials, preferably consisting of a thermoplastic material or a plastic suitable for processing by compression sintering, such as PTFE, or also of a metal, where appropriate, without being limited to this. The supporting ring can be manufactured by an injection molding process. The sealing ring in each case consists of an elastomeric material, e.g. rubber or synthetic rubber, which is preferably cross-linked. The sealing ring itself is preferably not compressible in each case.

Figure 2:
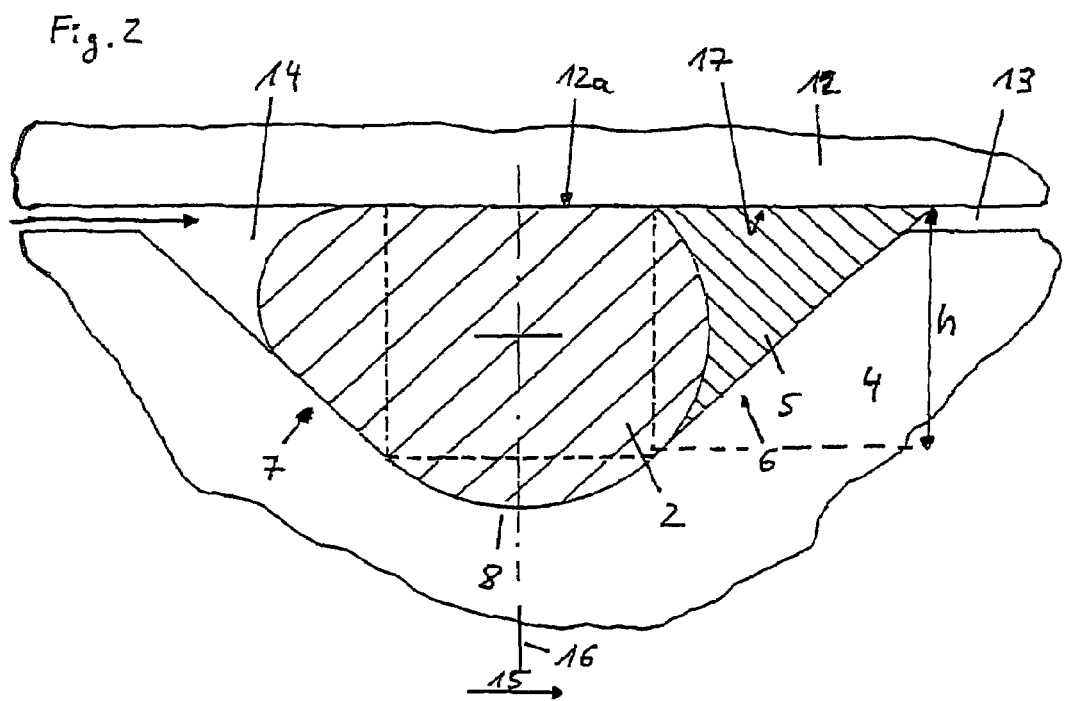
Figure 5:
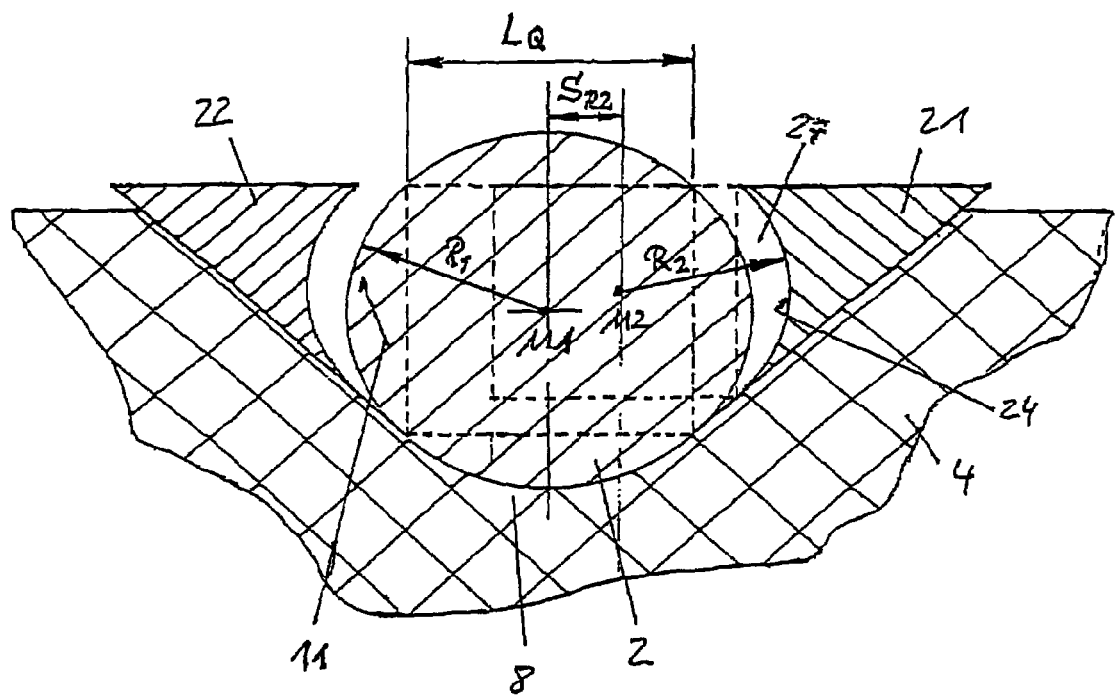

An example of the invention is described below and explained on the basis of the Figures. The Figures show the following:

FIG. 1 A schematic cross-sectional representation of a first embodiment with loosely inserted sealing ring, FIG. 2 A sealing ring arrangement with supporting ring according to FIG. 1 in installed state, FIG. 3 A schematic cross-sectional representation of a sealing arrangement according to the invention with two supporting rings, FIG. 4 A schematic representation of the arrangement according to FIG. 3 in installed state, and FIG. 5 A further schematic representation of the sealing arrangement according to FIG. 3.

FIG. 1 shows a sealing arrangement 1 according to the invention, with an elastic sealing ring 2 in the form of an O-ring inserted loosely in a groove 3 of a first component 4, where the groove is continuous and runs around the outer circumference of the component, e.g. a shaft or a piston. Sealing ring 2 can be located in the groove with a certain degree of radial pre-tension, although its cross-sectional shape is essentially or completely preserved in this context. Groove 3 displays a first groove flank 6, facing towards a supporting ring 5, and an opposite, second groove flank 7, as well as a groove base 8, which is of arc-shaped design in this instance. Groove flanks 6, 7 are designed as lateral surfaces with the shape of a truncated cone with a constant inclination, and enclose an angle of 90°. The groove displays an essentially triangular cross-section, where the groove base is assigned to one corner of the cross-section and the groove widens towards the open groove side. The sealing ring is supported against a fluid pressure (arrow) by supporting ring 5, the groove-side sealing surface 10 of which makes surface contact, more precisely full surface contact, with groove flank 6 and provides sealing against the fluid medium. Further, supporting ring 5 displays a sealing surface 9, which can be positioned against the sealing ring in sealing fashion and is designed as a concave area with an arc-shaped cross-section, more precisely a circular arc-shaped cross-section. Sealing ring 2 thus displays at least two arc-shaped cross-sectional areas 11, which serve as sealing surfaces against the groove base and the supporting ring. The radii of sealing surfaces 11 of the sealing ring correspond to the radii of curvature of sealing surface 9 and groove base 8. In this context, the sealing ring as a whole displays a circular cross-section, although modifications of the cross-sectional geometry of the sealing ring are also possible, provided that they do not impair or eliminate the mode of operation according to the invention.

FIG. 2 shows the sealing arrangement in installed state, where sealing ring 2 is compressed between the first and second components 4, 12, changing its cross-sectional shape, and its area 12a lies against second component 12 in sealing fashion, thereby sealing off the gap 13 between the first and second components against the fluid (arrow). In this context, the volume of groove 3 (plus the gap volume) is dimensioned in such a way that, in addition to the space for accommodating the supporting ring and the sealing ring, a free volume 14 is left, which is located in the third corner area of the triangular groove and borders on gap 13 on the pressure side. In this context, the sealing ring lies in sealing fashion on groove base 8, groove flank 7 and sealing surface 9 of the supporting ring. In this context, the sealing ring is surrounded, over angles at circumference of approx. 90° in each case, by supporting ring 5 and groove base 8, forming sealing surfaces, more precisely one continuous sealing surface in the circumferential direction of the sealing ring, where the contour of sealing surface 9 and groove base 8 each correspond to the curvature of the opposite area of the sealing ring when inserted loosely, i.e. are designed as segments of an arc of a circle. This results in very close surrounding of the sealing ring over approx. 180°, which is adapted to its cross-sectional geometry such that the sealing ring is virtually not deformed in the area of arc-shaped cross-sections 11. Even in the presence of pressure fluctuations, there is thus virtually no material fatigue in the area of the sealing surfaces. Rather, the compression of the sealing ring between the two components 4, 12 leads to deformation of the sealing ring on the side opposite the sealing ring. Further, the curvatures of supporting ring sealing surface 8 and of the groove area bordering on the supporting ring, essentially groove base 8 in this instance, are adapted to each other in such a way that the two adjacent sealing surfaces of supporting ring 5 and groove 3, the sealing surface in the area of groove base 8 in this instance, transition into each other in such a way that they lie on a common arc of a circle, the circumference of the arc of the circle of the sealing ring in this instance. This avoids a sudden change in the angle of incidence of the sealing surface of the supporting ring and/or the groove relative to the sealing ring axis 15.

The height h of supporting ring 5 is smaller than the distance of the groove base from opposite component 12, against which the sealing ring lies in sealing fashion, and also smaller than the depth of groove 3. Owing to the inclination of supporting ring-side groove flank 6 relative to sealing ring axis 15, it is possible for the sealing ring to position the supporting ring in its target position at gap 13. In this context, groove flank 6 lies at an angle of 45° to the sealing ring axis, meaning that the angle enclosed by supporting ring surfaces 9 and 10 is also 45°. In this context, groove flank 6 transitions tangentially into groove base 8 with circular arc profile.

According to the practical example, supporting ring side 17, facing away from the groove base, likewise forms a sealing surface against component 12, where, in order to reduce extrusion, only side 17 of the supporting ring has to project into gap 13 in order to constrict it. As a result of the inclination of groove flank 6, and thus also of supporting ring surface 10 making full surface contact with it, by approx. 45° relative to the sealing ring axis, the supporting ring finds its target position owing to the compression of the sealing ring, and the supporting ring and the sealing ring mutually center each other in the groove. In this context, the supporting ring can, while preserving the sealing action against groove flank 6, be moved along groove flank 6 to a certain degree, either towards the groove base or towards opposite component 12. This is facilitated by a certain degree of elasticity of the supporting ring, particularly due to division of the supporting ring, where the supporting ring can display areas that overlap each other in the direction of pressure and act in the manner of a lock. The dividing line can, for example, have a Z-shaped profile to this end.

When installed in accordance with FIG. 2, the sealing ring is compressed, its radial extension from the groove base being reduced by approx. 15% referred to its original diameter, where the square inscribed in the sealing ring cross-section, which preferably has all corners contacting the arc of the circle, is not touched by the compression.

FIGS. 3 and 4 show another sealing arrangement 20 according to the invention, with supporting rings 21, 22 located on both sides of sealing ring 2, this being advantageous in the presence of bilaterally acting fluid pressure. Groove 3, displaying an essentially triangular cross-section, and the arrangement of sealing ring 2 in the groove in loosely inserted state, correspond to those of the practical example illustrated in FIGS. 1 and 2, the entire content of which is herewith referred to. Identical features are given identical reference numbers.

As in FIGS. 1 and 2, the result achieved according to this practical example by the essentially triangular cross-sectional shape of groove and supporting ring, and the surface contact of the respective supporting ring on groove flank 6, 7, lying at an angle of 45° to sealing ring axis 15, is again that both supporting ring 22 on the high-pressure side and supporting ring 21 on the low-pressure side are each centered in their target position in reference to gap 13 located between components 4, 12, where, on the other hand, the position of the sealing ring is defined by the two supporting rings. In this context, the sealing arrangement is of symmetrical design in reference to principal sealing ring plane 16.

In contrast to the previous practical example, supporting rings 21, 22 display a smaller height h, meaning that when sealing ring 2 is only inserted loosely in the groove, supporting rings 21, 22 are at a slight lateral distance from the sealing ring, whereas in installed state as per FIG. 4, when the sealing ring is compressed between components 4, 12, the sealing ring touches, or almost touches, supporting rings 21, 22, meaning that sealing ring 2 is pressed against the respective sealing surface 24, 25 of the supporting ring, at least when the respective device is operated at the intended fluid pressure. In this context, height h of the supporting ring in the radial direction corresponds roughly to 70% of the distance of sealing surface 26 of second component 12 from groove base 8, and roughly 75% of the groove depth. Further, height h of the supporting ring is smaller than the edge length of the square inscribed in the sealing ring cross-section, all corners of which touch the circumference of the cross-section, whereas height h of the supporting ring according to FIGS. 1 and 2 essentially corresponds to the edge length of the square. As also according to the first practical example, the sealing ring is compressed between the two components 4, 12 in such a way that the inscribed square is preserved and sealing surface 26 of component 12 coincides with one edge of the square. The deviations in height are preferably $\leq$10%, more preferably $\leq$3% to 5%.

Owing to the symmetrical arrangement and design of supporting rings 21, 22, the sealing ring is also positioned symmetrically in relation to principal sealing ring plane 16 in compressed state (FIG. 4).

Here, too, supporting rings 21, 22 display arc-shaped, more precisely circular arc-shaped, concave sealing surfaces 24, 25, the radius of curvature R2 of which is in this instance smaller than the radius of curvature R1 of the sealing ring designed as an O-ring (see FIG. 5). In this context, the midpoint of radius R2 is offset from the center of a circle M1 towards the respective supporting ring, optimally by the amount S(R2), in which context deviations are possible, where appropriate, although they should preferably be $\leq$10%, particularly preferably $\leq$3% to 5%. Further, the center of a circle M2 is offset away from the groove base relative to the center of a circle M1, such that, ideally, the lateral edges of the squares inscribed with radii R1 and R2 in the arcs of the circle coincide. This provides an optimum sealing arrangement with defined positions of the sealing ring and supporting rings 21, 22, resulting in a particularly long service life with very great tightness of the sealing arrangement and virtually completely prevented extrusion of the sealing ring through gap 13. It goes without saying that, where appropriate, it is also possible to provide a supporting ring 21 designed according to this practical example only on one side of a sealing ring as a modification of the first practical example.

Further, one or both of the supporting rings 21, 22 is or are designed in such a way that a gap 27 of defined gap width is left in each case between the sealing ring and the supporting ring, even when the sealing ring is compressed between components 4, 12. In this context, gap 27 widens from the groove base towards the open groove side when the sealing ring is only inserted loosely in the groove (see FIG. 3), where gap 27*a* when the sealing ring is compressed (FIG. 4) can display an essentially uniform gap width or, where appropriate, also taper towards the groove base and/or towards the free groove side, or also widen, where appropriate, although this is less preferable. When the sealing ring is compressed, the gap volume of each of the two gaps is approx. 3% of the sealing ring volume. This avoids undesired pinching of the sealing ring, even in the event of strongly pulsating pressures, and particularly in the event of thermal expansion of the sealing ring, thereby additionally increasing its service life while maintaining optimum tightness.

In the sealing arrangement according to FIGS. 3 and 4, the sealing ring lies in sealing fashion both against groove base 8 and against the two groove flanks 6, 7, where the two groove flanks are designed in the manner of lateral surfaces of a truncated cone with linear cross-section. In this context, arc-shaped concave sealing surface 8 of supporting rings 21, 22 (or also of only one of them) transitions essentially steadily into adjacent groove flank 6, 7, which lies essentially tangentially to the arc segment forming the sealing surface.

Further, also according to this practical example, each of the supporting rings 21, 22 provides a sealing surface 28, 29, which makes surface contact, particularly full surface contact, with second component 12.

According to both embodiments in FIGS. 1, 2 and 3, 4, the inclination of the groove-side contact surface of the supporting ring and the concave area creates a geometry such that, when using the sealing arrangement as a rotary shaft seal, a fixed arrangement of the sealing ring relative to the supporting ring, and also of the sealing ring and the supporting ring relative to the first component, is provided even at low fluid pressures. In this context, gap 13 is bridged completely by the supporting ring.

Also according to the practical example in FIGS. 3 and 4, the sealing ring is designed as a closed ring, whereas the supporting ring is preferably divided in order to allow it to expand radially.

The sealing arrangement according to the invention thus completely prevents extrusion of the sealing ring through the gap between the two components, additionally bringing about a substantial increase in the service life of the sealing ring, in which context it is at the same time also possible to use sealing rings, the quality of whose surface finish does not have to be subject to any special requirements, particularly the quality of deburring.

LIST OF REFERENCE NUMBERS

1 Sealing arrangement
2 Sealing ring
3 Groove
4 Component
5 Supporting ring
6 Groove flank
7 Groove flank
8 Groove base
9,10 Sealing surface
11 Arc-shaped cross-sectional area
12 Second component
12a Sealing area
13 Gap
14 Free volume
15 Sealing ring axis
16 Principal sealing ring plane
17 Supporting-ring side
20 Sealing arrangement
21, 22 Supporting ring
24, 25 Sealing surface
26 Sealing surface
27 Gap
27a Gap
28, 29 Sealing surface
M1 Center of circle 1
M2 Center of circle 2
R1 Radius 1
R2 Radius 2
S(R2) Distance R1-R2
h Supporting ring height

What is claimed is:

1. A sealing arrangement comprising an elastic sealing ring, which is located between a first and a second component surrounding each other wherein a gap is formed between said first and said second component, wherein the sealing ring has a circular cross-section in its disassembled state with a radius and a sealing axis, where the sealing ring is located in a continuous groove, running around the inner or outer circumference of the first component, which displays a first and a second, opposite, groove flank and a groove base, wherein at least one supporting ring is further provided, one sealing surface of the at least one supporting ring lies in sealing fashion against the sealing ring, while an opposite, supporting surface lies against one of the first and the second, opposite, groove flanks on the supporting-ring side, wherein the groove displays an essentially triangular cross-section, with one corner of the cross-section forming the groove base, both groove flanks enclosing an angle of 60°-120° with each other, wherein at least the groove flank on the supporting-ring side is inclined relative to the sealing ring axis, wherein the at least one supporting ring displays an essentially triangular cross-section and, in installed state, a smaller height than the distance of the groove base from the second component, wherein the at least one supporting ring is positioned by the sealing ring, which is compressed in installed state, in its position at the gap to be sealed between the first and second components, wherein the groove base cross-section has a radius that is equal to the radius of the sealing ring when the sealing ring is inserted in the groove, wherein the sealing ring-side sealing surface of the at least one supporting ring is concave having a radius that is equal to the radius of the sealing ring, wherein the sealing surface of the at least one supporting ring and of the groove base transition into each other in such a way that they lie on a common arc of circle being the circumference of the arc of the circle of the sealing ring, wherein a continuous sealing surface is formed extending over the supporting ring-sealing surface and one of the first and the second, opposite groove flanks, wherein, when inserted in the groove, the sealing ring lies at least in sealing fashion against the sealing surface of the at least one supporting ring and the groove base, and wherein, in the installed state, the sealing ring is compressed into the groove, deforming its cross-section so that the sealing ring lies in sealing fashion against the sealing surface of the supporting ring and the groove base and against the groove flank that is arranged opposite the at least one supporting ring, forming a continuous sealing surface extending over the supporting ring-sealing surface, the groove base and the groove flank being opposite to the supporting ring.

2. The sealing arrangement according to claim 1, characterized in that the groove flank on the supporting-ring side displays an angle of ≧65° relative to the sealing ring axis.

3. The sealing arrangement according to claim 1, characterized in that the sealing ring, when loosely inserted in the groove, or in compressed and pressurized state, or in both states, lies continuously on the groove base and in some areas on the two groove flanks bordering the groove base.

4. The sealing arrangement according to claim 1, characterized in that the concave surface of the supporting ring transitions at least essentially steadily into the adjacent sealing area of the groove.

5. The sealing arrangement according to claim 4, characterized in that the radius of curvature of the concave surface of the supporting ring is approx. 10% to 20% smaller than the radius of curvature of the sealing ring.

6. The sealing arrangement according to claim 4, characterized in that the distance of the center of curvature of the concave surface of the supporting ring from the center of curvature of the convexity of the sealing ring, or of an envelope of the sealing ring cross-section, is approx. 0.3 to approx. 0.4 times the radius of the sealing ring curvature, or of the envelope of the sealing ring cross-section.

7. The sealing arrangement according to claim 1, characterized in that the concave surface of the supporting ring display a curvature or a radius of curvature that is roughly equal to, or smaller than, the curvature or the radius of curvature of the opposite sealing ring area of the dismantled sealing ring.

8. The sealing arrangement according to claim 7, characterized in that the radius of curvature of the concave surface of the supporting ring is approx. 10% to 20% smaller than the radius of curvature of the sealing ring.

9. The sealing arrangement according to claim 8, characterized in that the distance of the center of curvature of the concave surface of the supporting ring from the center of curvature of the convexity of the sealing ring, or of an envelope of the sealing ring cross-section, is approx. 0.3 to approx. 0.4 times the radius of the sealing ring curvature, or of the envelope of the sealing ring cross-section.

10. The sealing arrangement according to claim 1, characterized in that the radial height (h) of the supporting ring is approx. 40% to approx. 80% of the distance of the groove base from the opposite sealing surface of the second component.

11. The sealing arrangement according to claim 1, characterized in that, in installed state of the sealing ring and when the supporting ring lies against the groove flank, a gap is left between the sealing ring and the supporting ring, at least in some areas.

12. The sealing arrangement according to claim 11, characterized in that the gap volume of the gap between the sealing ring and the supporting ring is between approx. 1% and approx. 8% of the sealing ring volume.

13. The sealing arrangement according to claim 1, characterized in that the supporting ring located in the groove of the first component lies, on its surface opposite the groove base, in sealing fashion against the second component.

14. The sealing arrangement according to claim 1, characterized in that, in installed state, the sealing ring is compressed by approx. 10% to 20%, referred to its diameter when the sealing ring is dismantled.

15. The sealing arrangement according to claim 1, characterized in that the sealing ring is surrounded by a supporting ring on both sides.

16. The sealing arrangement according to claim 1, characterized in that the sealing ring acts as a piston ring or as a rotary shaft seal.

17. The sealing arrangement according to claim 16, characterized in that, for use as a rotary shaft seal, the sealing arrangement is designed in such a way that, at the intended fluid pressure of the fluid sealed off by the seal, the sealing ring and the supporting ring are located in a fixed position relative to each other when the shaft rotates.

18. A sealing arrangement comprising an elastic sealing ring, which is located between a first and a second component surrounding each other wherein a gap is formed between said first and said second component, wherein the sealing ring has a circular cross-section in its disassembled state with a radius and a sealing axis, where the sealing ring is located in a continuous groove, running around the inner or outer circumference of the first component, which displays a first and a second, opposite, groove flank and a groove base, wherein at least one supporting ring is further provided, one sealing surface of the at least one supporting ring lies in sealing fashion against the sealing ring, while an opposite, supporting surface lies against a one of the first and second, opposite, groove flanks on the supporting-ring side, wherein the groove displays an essentially triangular cross-section, with one corner of the cross-section forming the groove base, wherein at least the groove flank on the supporting-ring side is inclined relative to the sealing ring axis, both groove flanks enclosing an angle of 60°-120° with each other, wherein the at least one supporting ring displays an essentially triangular cross-section and, in installed state, a smaller height than the distance of the groove base from the second component, wherein the at least one supporting ring is positioned by the sealing ring, which is compressed in installed state, in its position at the gap to be sealed between the first and second components, wherein the groove base cross-section has a radius that is equal to the radius of the sealing ring when the sealing ring is inserted in the groove, wherein the sealing ring-side sealing surface of the at least one supporting ring is concave having a radius that is equal to the radius of the sealing ring, wherein the concave surface of the supporting ring transitions (1) into the adjacent sealing area of the groove flank that extends tangentially to the transitional area of the concave surface of the supporting ring, or (2) into the groove base, wherein, when inserted in the groove, the sealing ring lies at least in sealing fashion against the sealing surface of the supporting ring and the groove base, forming a continuous sealing surface extending over the supporting ring-sealing surface and one of the first and second, opposite, groove flanks, wherein, in installed state, the sealing ring is compressed into the groove, deforming its cross-section so that the sealing ring lies in sealing fashion against the sealing surface of the supporting ring, the groove base and against the groove flank that is arranged opposite the supporting ring, forming a continuous sealing surface extending over the supporting ring-sealing surface, the groove base and the groove flank being opposite to the supporting ring and encapsulating the sealing ring in the groove to avoid any flexing work of the sealing ring in the event of fluctuating pressures.

* * * * *

UNITED STATES PATENT AND TRADEMARK OFFICE
CERTIFICATE OF CORRECTION

PATENT NO. : 7,516,963 B2
APPLICATION NO. : 11/252195
DATED : April 14, 2009
INVENTOR(S) : Dieter Meller Page 1 of 1

It is certified that error appears in the above-identified patent and that said Letters Patent is hereby corrected as shown below:

On the Title page, in Item (57), under "Abstract", in column 2, line 8, delete "(6)" and insert -- (6). --, therefor.

In column 12, line 62, in Claim 2, delete "≧65°" and insert -- ≦ 65° --, therefor.

In column 14, line 17, in Claim 18, after "against" delete "a".

Signed and Sealed this

Thirtieth Day of June, 2009

JOHN DOLL
*Acting Director of the United States Patent and Trademark Office*